2,794,036

CORTISONE-UNDECYLATE

Emanuel Kaspar, Berlin-Wilmersdorf, and Martin Schenck, Berlin-Frohnau, Germany, assignors to Firma Schering A. G., Berlin, Germany No Drawing. Application November 16, 1954,
Serial No. 469,300

Claims priority, application Germany November 21, 1953

1 Claim. (Cl. 260—397.45)

The present invention relates to the production of a new composition of matter namely cortisone-undecylate.

According to the present invention the hydroxyl group in the 21-position of cortisone is esterified with undecylic acid to form cortisone-undecylate, a new substance having important properties.

The cortisone-undecylate, which is the 21-undecylic acid ester of cortisone, has the following structural formula:

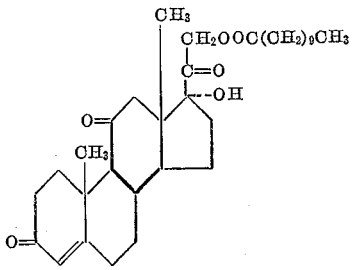

It has been found that this ester, which may be produced preferably by the reaction of cortisone with the anhydride or the halogenide of undecylic acid and recovered in known manner, has a remarkably high solubility as compared to cortisone esters of homologous acids. This is particularly important in that cortisone-undecylate is very soluble in solvents which are suitable for injection purposes, particularly in levulinic acid esters such as levulinic acid octyl ester.

This outstanding high solubility is of considerable technical importance in the manufacture of valuable cortisone preparations for injection purposes which have recently come into great demand in practical therapy for hormone storage in the organism. The undecylate as compared with other esters of cortisone has proved to be an especially good and long acting cortisone compound, as measured by intensity and duration of the effect on the thymus weight of the infantile male rat.

The following examples are given as illustrative of the process of the present invention, the scope of the invention not however being limited to the specific details of the examples.

Example 1

2 g. of raw cortisone (obtained by the saponification of cortisone acetate) is dissolved in 15 cc. of pyridine in a nitrogen atmosphere. 3.25 g. of undecylic acid anhydride is added and brought into solution. After 20 hours of standing at 37° C. the reaction mass is shaken with chloroform. The chloroform solution is washed with normal hydrochloric acid and water and after drying under reduced pressure is evaporated. The residue remaining is rubbed with petane and the thus purified undecylate is recrystallized in a small amount of methanol. The yield is 1.95 g. of cortisone-undecylate. After drying at 100° C. and 1 mm. Hg of pressure the melting point is found to be 111°–112° C. $[\alpha]_D^{22} = +174°$ (c.=1 CHCl₃).

Example 2

500 mg. of raw cortisone is dissolved in 4 cc. of pyridine in a nitrogen atmosphere and 0.9 cc. of undecylic acid chloride is added at 5° C. After standing for 2 days at 5° C., ice water is added, the reaction mass is shaken with chloroform and further worked up as in Example 1. The melting point of the cortisone-undecylate thus obtained is 111°–112° C.

The following table is given to compare the solubility of cortisone-undecylate in each of the following solvents with the solubility of homologous cortisone esters produced in analogous manner. The solubility of cortisone-undecylate and of the other esters was determined at room temperature in 1 cc. of each of the following solvents which are utilized for injection purposes:

|  | oleic acid ethyl ester, mg. | undecylic acid ethyl ester, mg. | levulinic acid octyl ester, mg. |
|---|---|---|---|
| cortisone-undecylate | 22–25 | 90–100 | 300–325 |
| cortisone-acetate | 0.5 | 0.5–1 | 8–10 |
| cortisone-propionate | 0.5 | 0.5 | 2–3 |
| cortisone-butyrate | 0.75–1 | 1–2 | 10–15 |
| cortisone-valerianate | 0.5–1 | 1–2 | 10–15 |
| cortisone-capronate | 10–11 | 10–15 | 75–90 |
| cortisone-oenanthate | 11–12 | 20–22 | 130–140 |
| cortisone-caprylate | 10–11 | 15–20 | 75–90 |
| cortisone-pelargonate | 3–5 | 7–10 | 30–40 |
| cortisone-caprinate | 5–7 | 10–15 | 75–90 |

To determine the solubility, measured amounts of the particular ester was shaken with 1 cc. of the solvent in closed ampules at room temperature. The lower of the two above stated figures indicates the amount which forms a clear solution while at the higher amount indicated by the second figure only a slight, just noticeable amount remains permanently undissolved.

It may be seen from the above table that the solubility of the esters in all three solvents continues to rise along the homologous series until a definite maximum is reached at the oenanthate which maximum is not exceeded to any degree by the other esters further along in the homologous series while the undecylate of the present invention has a maximum which is much greater in value for all of the solvents.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

As a new composition of matter, cortisone-undecylate.

References Cited in the file of this patent

UNITED STATES PATENTS 2,183,589      Reichstein      Dec. 19, 1939